UNITED STATES PATENT OFFICE.

OLOF SÖDERLUND, OF LONDON, ENGLAND, ASSIGNOR TO TECHNO-CHEMICAL LABORATORIES, LIMITED, OF LONDON, ENGLAND.

EVAPORATOR.

1,150,713.      Specification of Letters Patent.     Patented Aug. 17, 1915.

Application filed October 31, 1911. Serial No. 657,738.

*To all whom it may concern:*

Be it known that I, OLOF SÖDERLUND, a subject of the King of Sweden, and residing at Fairlawn, Clarence Road, Clapham Park, London, S. W., England, have invented a certain new and useful Improved Evaporator, of which the following is a specification.

This invention relates to improvements in connection with the evaporation, distillation or concentration of liquids, and similar operations.

I desire it to be understood that the term evaporator hereinafter employed is intended to include apparatus suitable for any one or more of the above operations.

By the present invention, evaporation may be effected in an apparatus without the employment of more than a small amount, if any, of external heat supplied as such to the apparatus.

According to the present invention, the vapor given off by the liquid which is being evaporated in an evaporator is withdrawn, compressed, and utilized as a heating medium for effecting or assisting in further evaporation by virtue of the increase of temperature which it has undergone owing to compression, the vapor being preferably for this purpose supplied after compression to a heating device to the heating action of which the liquid to be evaporated is exposed in a finely divided condition e. g. as a very thin film. For the efficient working of such an apparatus and therefore to allow of the most advantageous commercial utilization of the same the exposure of the liquid in a thin film is most important since if the heating device is caused to act upon a large body of the liquid to be evaporated a higher difference of temperature between the vapor in the heating element and the liquid it is heating (and therefore a higher compression) is required than if the vapor has only to heat a thin film of the liquid.

To this end apparatus for carrying out the present method in its preferred form comprises an outer vessel provided with a gas educt connected to a compressor, the outlet of which is connected to fluid heated heating means, over which the liquid to be distilled or concentrated is caused to flow in a thin film as by causing it to fall in a rain upon the upper part of the heating means. By causing the liquid which is to be evaporated to flow over the heating element in a thin film the free surface of the liquid is in this way largely increased and the evaporative efficiency of the device enhanced thereby.

Figure 1:
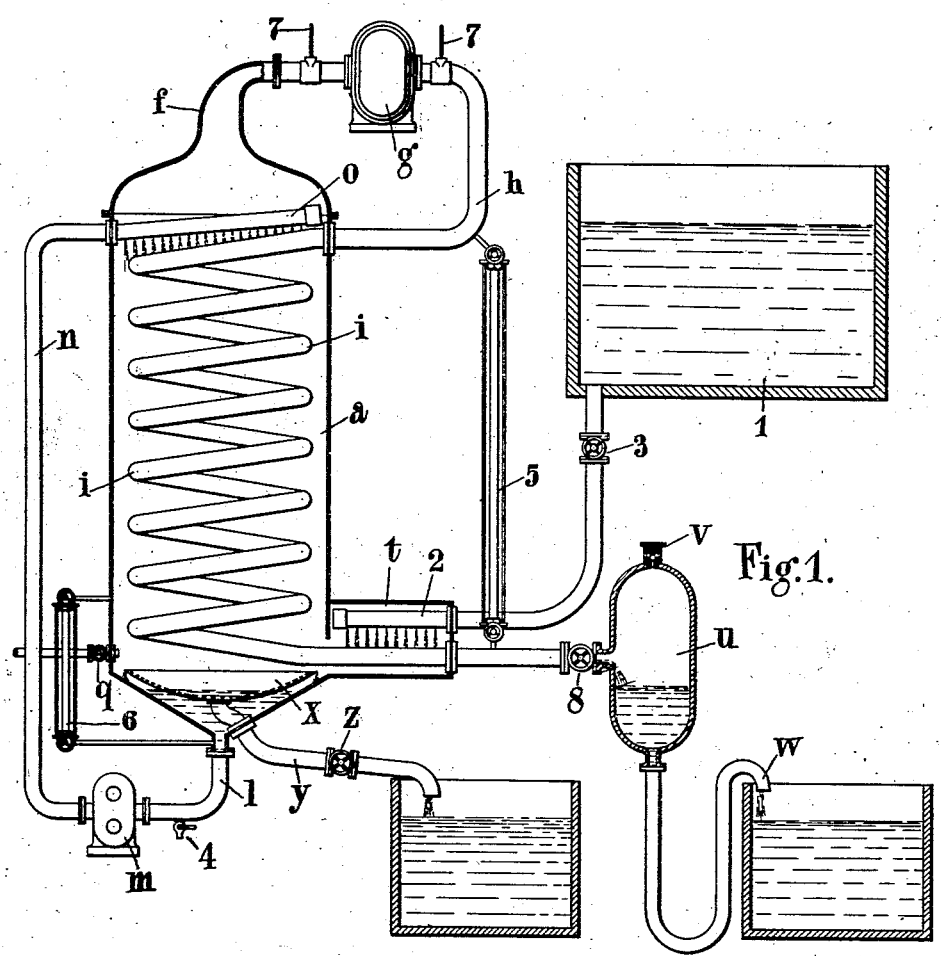
Figure 2:
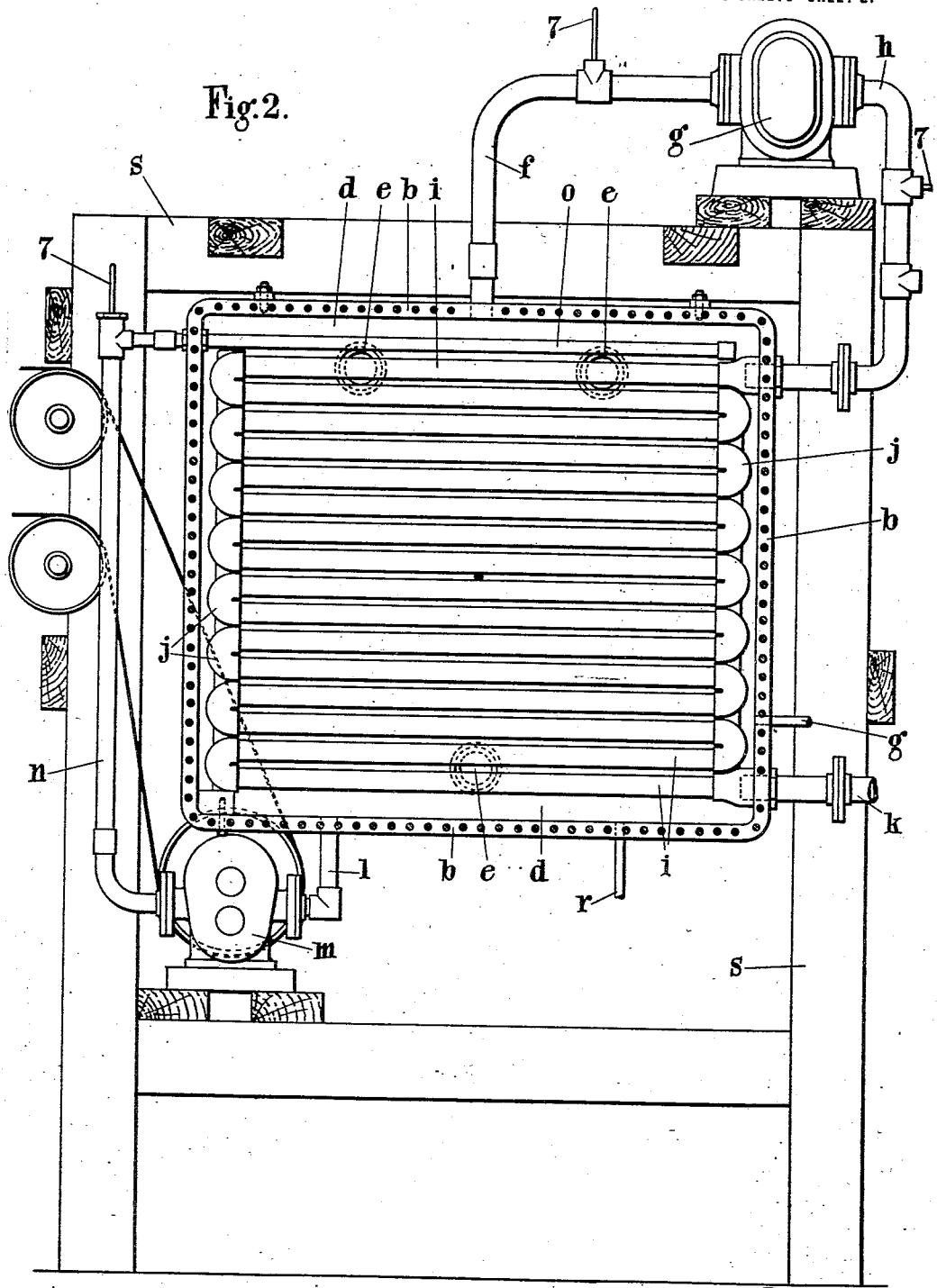
Figure 3:
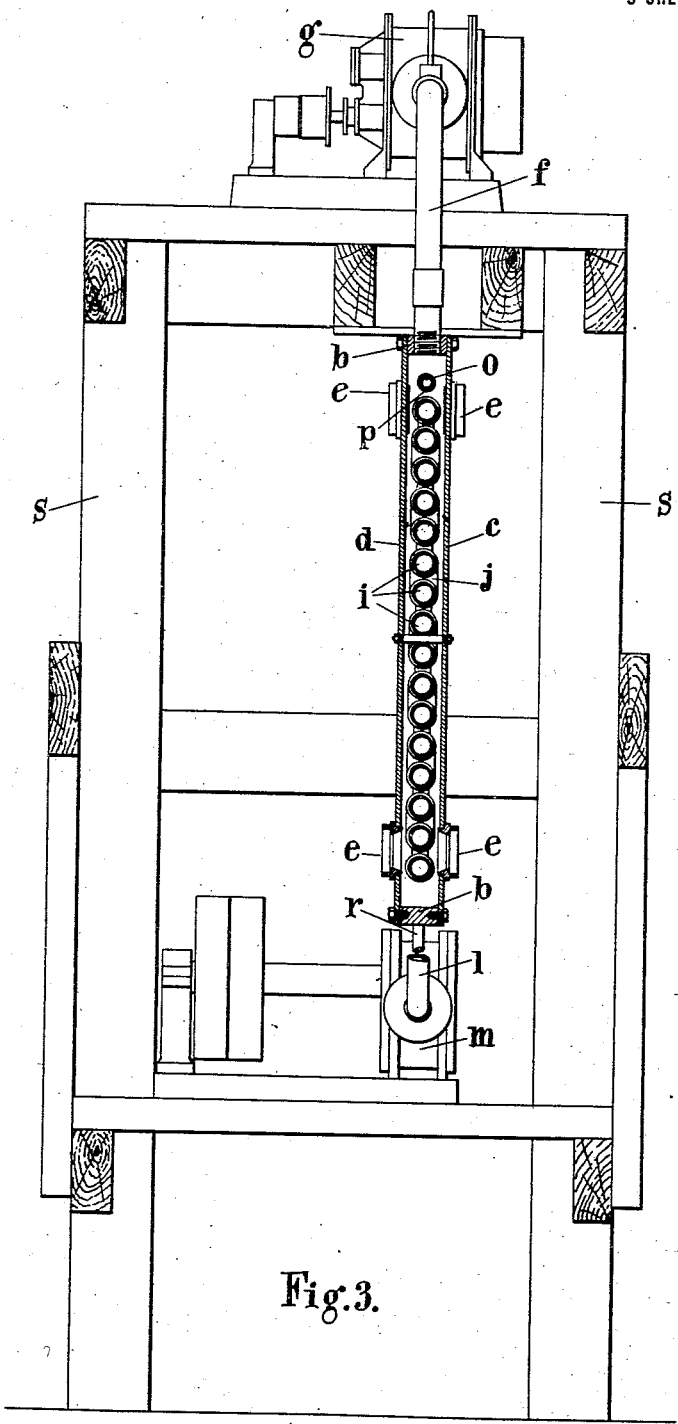

The accompanying drawings show in Figure 1 a vacuum evaporator in sectional elevation, and in Figs. 2 and 3 a modified form of evaporator in part sectional, front and side elevation, respectively.

Referring to Fig. 1, a cylindrical chamber $a$ has a gas or vapor outlet pipe $f$, connected to a suction compressor $g$ supplying a coil $i$ through a pipe $h$. The coil $i$ is extended into a chamber $t$ formed outside the main chamber, and passes thence into a reservoir $u$ having an automatic blow-off $v$, and an outlet for condensed vapors at $w$. The lower part of the main chamber is provided with a pipe $l$ connected to a pump $m$, which supplies a liquid distributing device $o$, (which is adapted to distribute the liquid as a rain upon the upper part of the coil $i$) by means of a pipe $n$. A funnel shaped element $x$, with the draw-off pipe $y$ and cock $z$, is provided to allow of using the apparatus continuously. A feed tank 1 supplies a distributing device 2 through a cock 3, the element 2 being adapted to distribute liquid over the lower portion of the coil pipe $i$. Cocks $q$ and 4, and gages 5 and 6, are also provided. Thermometers 7 are fitted at suitable points in the apparatus.

The operation of the device is as follows:—Assuming the apparatus to have been suitably heated up as by introducing steam by the cock, $q$, drawing it off by the element $g$, compressing it, and passing it into the coil $i$, the liquid to be heated is caused to flow from the distributing device 2 over the lower part of the tube $i$, and becomes warmed. It flows into the lower part of the chamber $a$, through the pipe $l$, and is pumped by the pump $m$ through the pipe $n$ to the distributer $e$ which causes it to flow in a relatively thin film whereby its free surface is also largely increased over the hot coil $i$. Evaporation occurs, and the vapor evolved is sucked away by the element $g$ compressed to raise its temperature sufficiently, say by some 5 degrees centigrade, and then passes through the pipe $h$ into the coil $i$. As its temperature by virtue of the compression is now above that of the liquid contacting with the tubes, it causes evaporation of the liquid. The vapor in the coil $i$ condenses, and the condensed vapor gives out its heat in flowing down the coil, to the liquid distributed over it, both in the chamber $a$ and in the chamber $t$, leading the coil through the cock 8, and entering the chambers $u$, from which the air accompanying the condensed liquid can escape at $v$, and the liquid passes away at $w$. The liquid, after flowing over the coil $i$, collects in the funnel $x$, and passes out through the pipe $y$ and cock $z$, if the apparatus is employed to effect the desired concentration in one passage of the liquid through the apparatus or the cock $z$ is partly or quite closed, when the liquid overflows from the funnel $x$, and is then returned to the distributer as often as desired before withdrawal. By introducing the steam for initially heating up the apparatus into the evaporation chamber $a$ instead of into the coil $i$ it is doubly utilized as it is in this way possible to pass it into the compressor $g$ and thence into the coil $i$ wherein it exercises an additional heating effect. The cock $q$ is also preferably used to introduce steam into the apparatus during evaporation as required to make up radiation losses and also to drive away any air which may be evolved from the boiling liquid and accumulate on the surface of the liquid. Such accumulation interrupts the active circulation of the vapors in the outer chamber and it is therefore desirable to promote the circulation in this way. Active circulation of the vapor in the apparatus assists the evaporation materially. The cock 4 gives means of sampling to ascertain when the desired concentration is attained in such a case. The gage 6 allows of observing the amount of liquid in the evaporator. The flow of condensed liquid from the coil $i$ is, by the cock 8, controlled to keep up the desired pressure in the coil.

It will be understood that all the exposed parts of the apparatus are lagged, or losses by radiation are in any other suitable manner reduced to a minimum. In this way it becomes possible to concentrate or distil liquid introduced into the apparatus, by utilizing the increase in temperature of the vapor evolved from the liquid, when the same is compressed.

In Figs. 2 and 3 is shown an experimental apparatus constructed on the above lines, which has been employed for the distillation of water. The evaporating chamber is in this case flat, and is formed of plates $c$ and $d$, bolted to a rim $b$. The plates have windows $e$ for inspecting the liquid distributing device $o$, and for ascertaining the amount of liquid in the chamber. A pipe $f$ issues from the top of the chamber, and is connected to a rotary compressor $g$, e. g., a Roots blower, which supplies through the pipe $h$ the serpentine composed of pipes $i$ connected to bends $j$. At $k$ is an outlet for condensed water, and at $l$ is a pipe adapted to conduct liquid from the chamber to a pump $m$, which supplies it to the distributing pipe $o$, having perforations $p$ through a pipe $n$. At $q$ is the pipe by which steam may be introduced for initially heating up the apparatus, and at $r$ is a pipe by which the liquid to be evaporated may be introduced. The whole apparatus is mounted in a framework $s$ and is provided with thermometers 7, as above. In order to obtain the best efficiency from such an apparatus, it will be understood that the heat contained in the outflowing condensed liquid should be regenerated, as completely as possible, and this may be effected by any suitable coil or other heat exchanging device. At the same time, the pre-heating effected in this way can be utilized to free the liquid entering the apparatus form air, so that only vapor free from air or other non-condensible gases is evolved from the liquid when it reaches the evaporator. As, however, the heat obtained by this pr-heating may not be sufficient for this purpose, it may be necessary to provide a special device, in which the additional heat necessary for this purpose may be provided by injection of steam into the liquid. It will be understood that where an apparatus of this character is employed, for the concentration of solutions of solids, care should be taken to avoid any concentration to dryness in the apparatus, with consequent choking up of the parts.

The operation of the device shown in Figs. 2 and 3 is the same as that above described with reference to Fig. 1. When distilling water experimentally in the latter apparatus, using a temperature difference between the outlet and inlet of the compressor of about 5 degrees centigrade, that is, temperatures of about 100 degrees and 105 degrees centigrade, respectively, obtainable by a compression equal to about one-tenth of an atmosphere, which is sufficient in the apparatus described, I have reached figures which appear to give an evaporative capacity several times greater than that obtainable in present multiple effect evaporator practice.

The compressed vapor or steam passing into the heating tubes will contain more heat than is required to evaporate an equivalent quantity of liquid from the fresh liquid to be evaporated, since compression of the vapor has raised its temperature not only to a higher temperature corresponding to the higher pressure, but it has also superheated the same to some extent, as can be readily calculated. In this way it is theoretically possible to generate the same amount of steam without adding more heat to the system, except that produced by the mechanical compression, which also can be made wholly or partially to compensate losses due to radiation and the temperature of the outflowing condensed liquid, which leaves at a higher temperature than the inflowing liquid. The latter may, however, be reduced to a minimum by heating the incoming liquid from the outgoing condensed liquid as referred to.

The method and apparatus according to the present invention is of particular advantage where fuel is scarce, but where means for generating mechanical power, such as falls of water, are readily available.

In order to make this evaporation system as economical as possible, it is of importance to employ only enough difference of pressure between the two sides of the heating surface as is necessary to insure a difference of temperature giving satisfactory heat transmission. The heat transmission will be increased not only by raising the temperature but by providing good and rapid circulation, which can be done as above indicated, by pumping the liquid from the lower part of the evaporator to the upper part, where it is distributed over the upper heating tubes, from which it streams down over the lower ones and back to the pump again, being continuously diluted with fresh incoming liquid, concentrated liquid being drawn off either intermittently or continuously, as desired.

Having now described my invention what I claim as new and desire to secure by Letters Patent is:—

1. A method of evaporating liquids in which the liquid is heated to boiling and the vapor therefrom compressed, the compressed vapor being caused to impart heat to the liquid to attain a temperature at most 5° C. above the boiling temperature of the liquid undergoing evaporation, which is kept continuously exposed to the heating action of the vapor as a downwardly flowing thin film until the desired degree of concentration is obtained; as set forth.

2. A method of evaporating liquids, consisting in spreading the liquid as a downwardly flowing thin film over a heating element, collecting the vapor evolved from said film, compressing said vapor to raise its temperature at most 5° C. above the boiling temperature of the liquid, and introducing said compressed vapor into the heating element, as set forth.

3. A method of evaporating a liquid consisting in heating the liquid to boiling, collecting the vapor evolved from it, compressing said vapor to raise its temperature only slightly, supplying said vapor to a heating element and distributing the liquid to be evaporated as a thin, uniform and rapidly moving film upon the heating element, by means independent of the temperature difference between the heated liquid and the heating vapor as set forth.

In testimony whereof I have signed my name to this specification in the presence of two subscribing witnesses.

OLOF SÖDERLUND.

Witnesses:
BERTRAM HARRY MATTHEWS,
E. C. WALKER.